Figure 13:
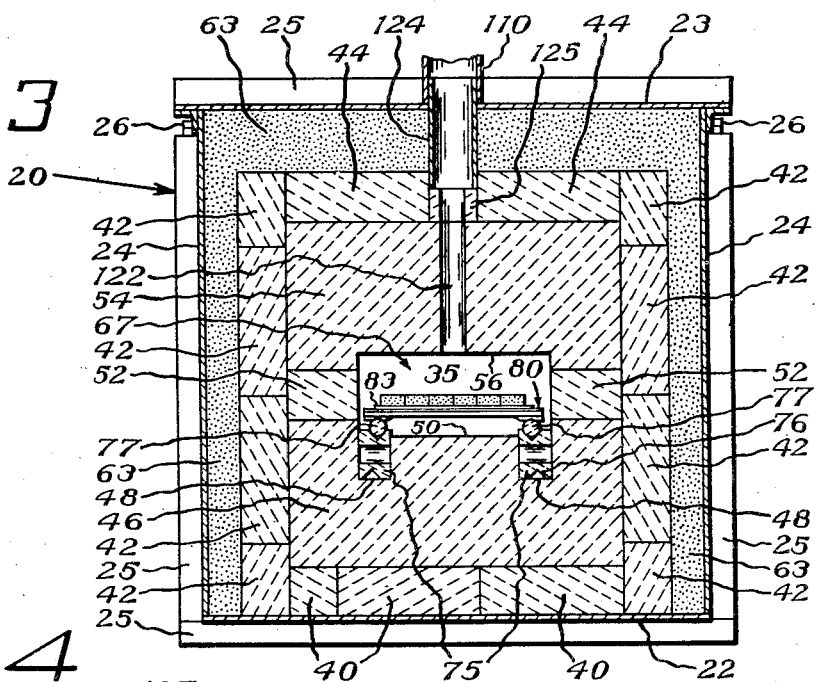

Aug. 15, 1950  G. N. JEPPSON ET AL  2,519,250
TUNNEL KILN
Filed May 10, 1947  7 Sheets-Sheet 1
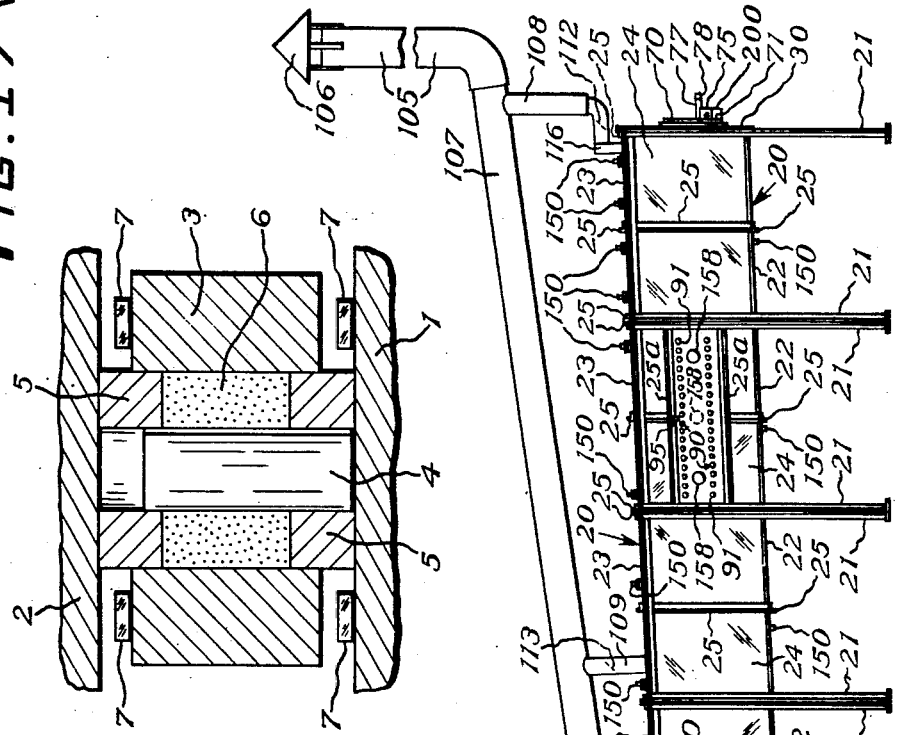
Inventors
GEORGE N. JEPPSON
EDWARD VAN DER PYL
WALLACE L. HOWE
By [signature] Attorney Aug. 15, 1950   G. N. JEPPSON ET AL   2,519,250
TUNNEL KILN
Filed May 10, 1947   7 Sheets-Sheet 2
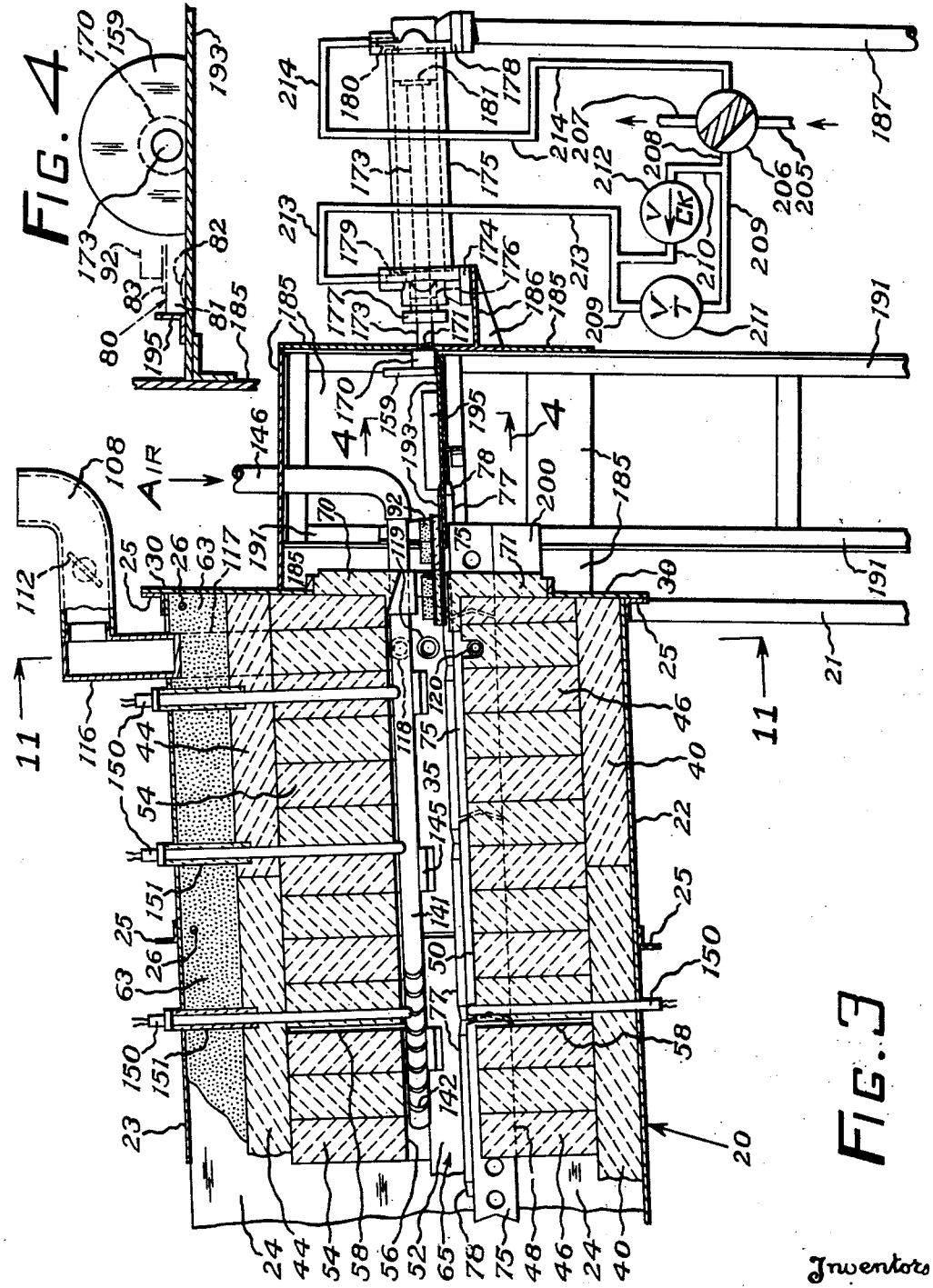
Inventors
GEORGE N. JEPPSON
EDWARD VAN DER PYL
WALLACE L. HOWE
By George Crampton
Attorney

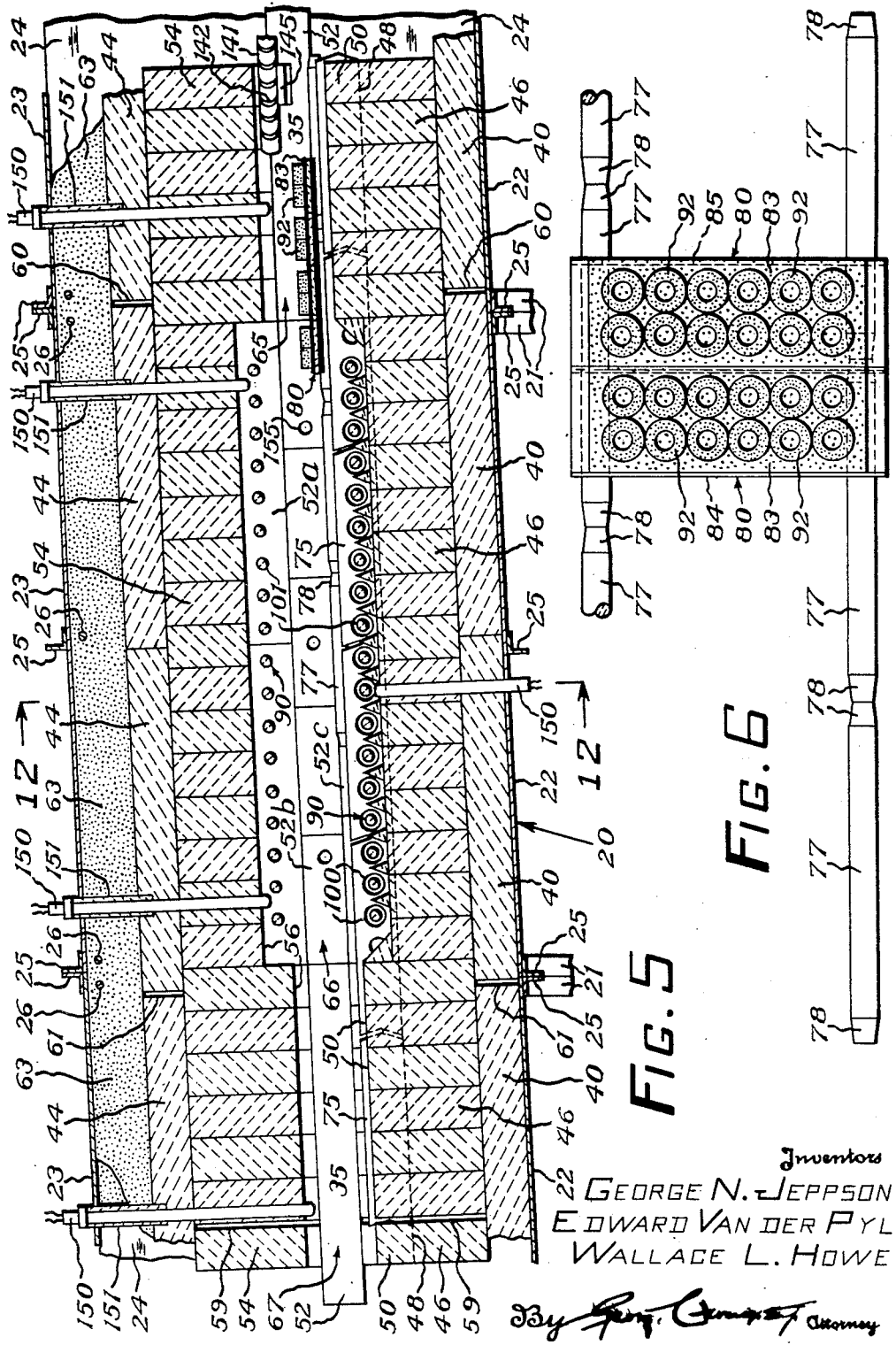

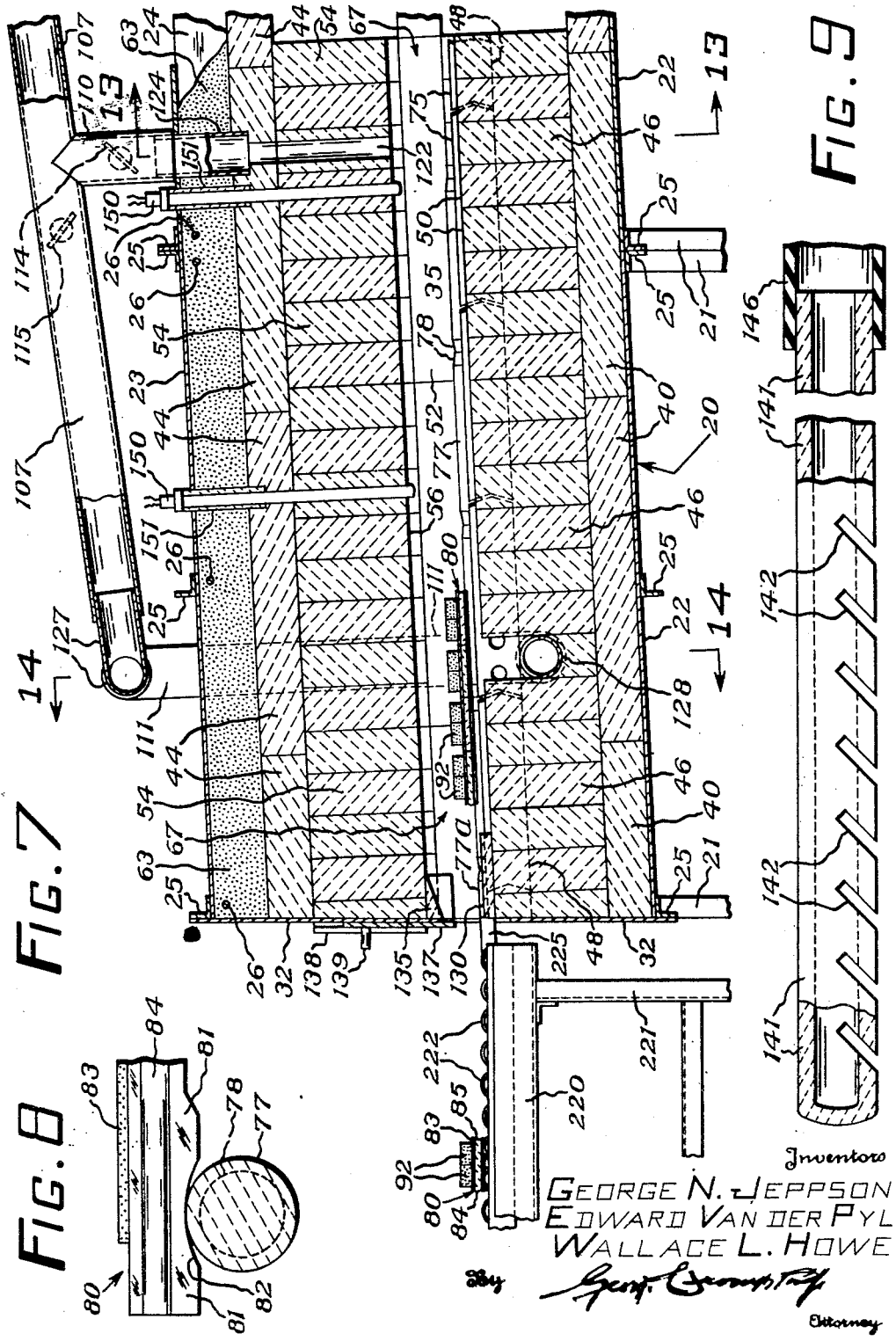

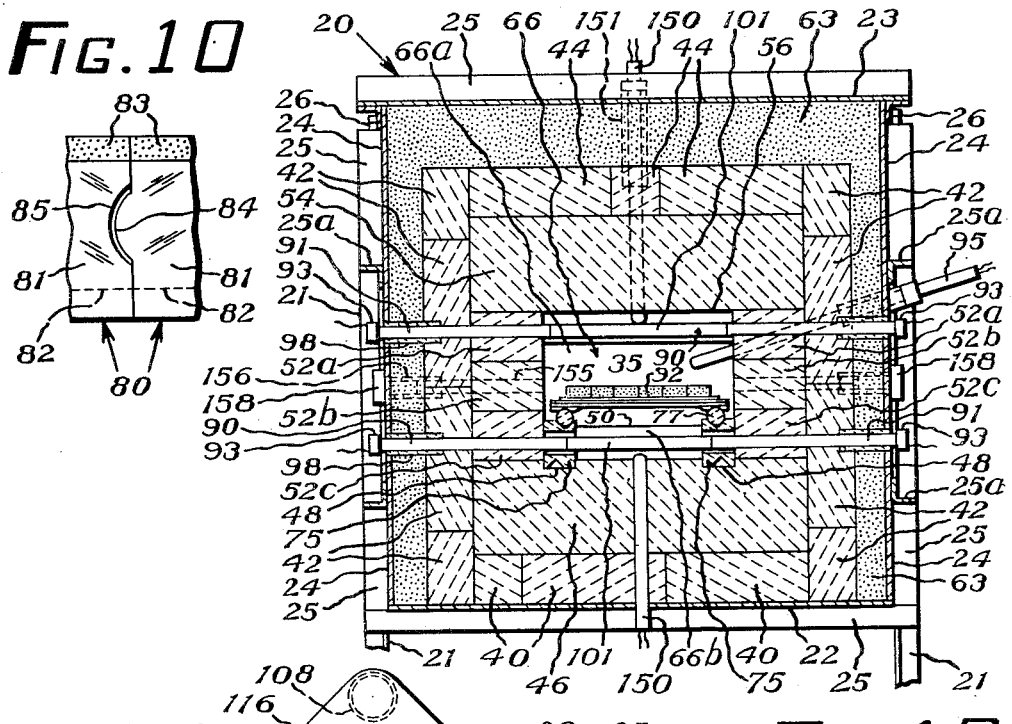
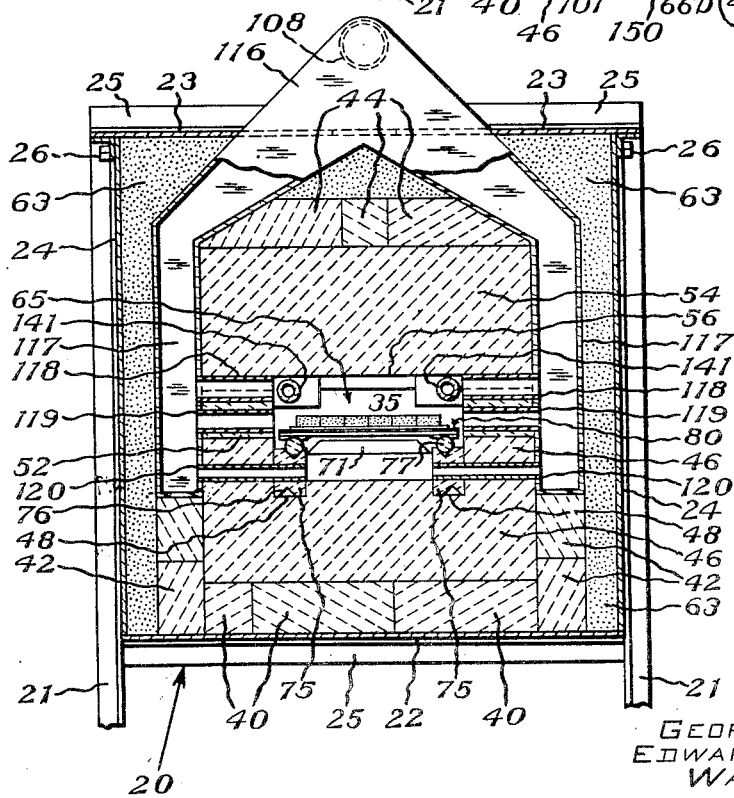

Aug. 15, 1950 G. N. JEPPSON ET AL 2,519,250
TUNNEL KILN
Filed May 10, 1947 7 Sheets-Sheet 6

Inventors
GEORGE N. JEPPSON
EDWARD VAN DER PYL
WALLACE L. HOWE
By George Crompton
Attorney Aug. 15, 1950  G. N. JEPPSON ET AL  2,519,250
TUNNEL KILN
Filed May 10, 1947  7 Sheets-Sheet 7
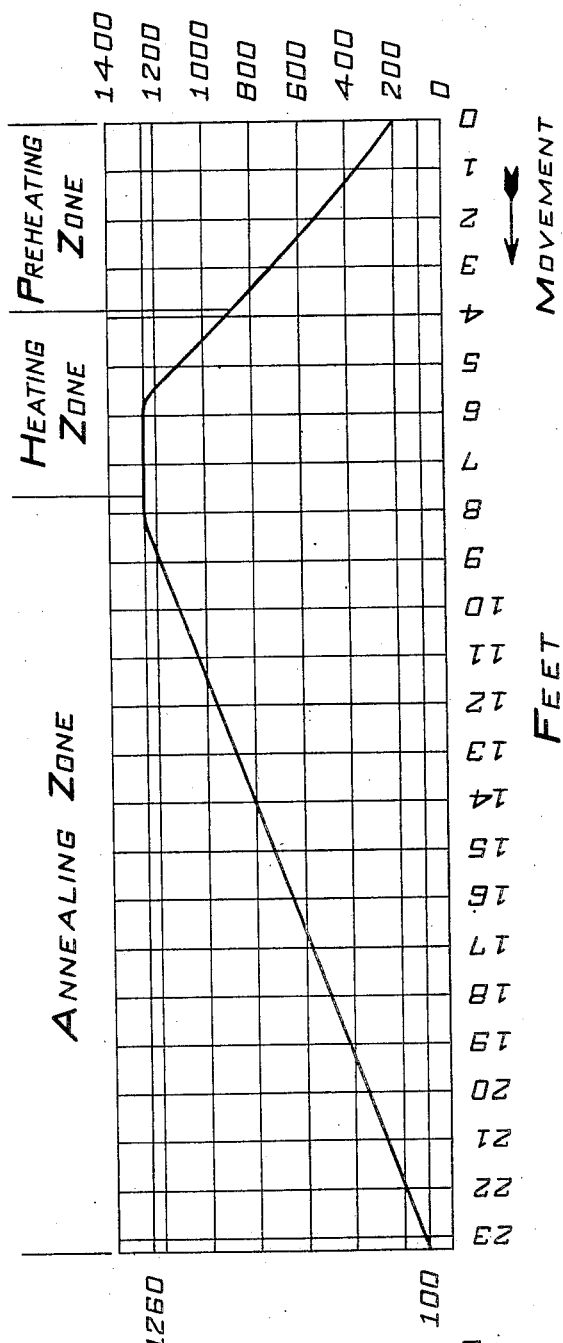
Inventors
GEORGE N. JEPPSON
EDWARD VAN DER PYL
WALLACE L. HOWE
By George Cumpings  Attorney Patented Aug. 15, 1950

2,519,250

UNITED STATES PATENT OFFICE 2,519,250

TUNNEL KILN

George N. Jeppson, Worcester, Edward Van der Pyl, Holden, and Wallace L. Howe, West Boylston, Mass., assignors to Norton Company, Worcester, Mass., a corporation of Massachusetts Application May 10, 1947, Serial No. 747,170

19 Claims. (Cl. 13—20)

The invention relates to vitrified grinding wheels and methods and apparatus for manufacturing them. This application discloses vitrified grinding wheels and method of manufacturing them claimed in our copending application Serial No. 68,012, filed December 29, 1948.

One object of the invention is to increase the rate of production of vitrified grinding wheels. Another object is to enable vitrified grinding wheels to be manufactured more cheaply.

Another object is to make stronger grinding wheels, which can therefore be run at higher speeds without breakage or without violation of the factor of safety regulations. Another object of the invention is to produce vitrified grinding wheels in quantity which have little or no strain therein. Another object is to produce vitrified grinding wheels of substantial thickness which will grade the same on both sides.

Another object of the invention is to provide a tunnel kiln with a preheating zone, a heating or firing zone and an annealing zone and controls in order to control the temperature at all places in the tunnel accurately. Another object is to provide a tunnel kiln for the vitrification of grinding wheels with electrical heating apparatus which can be readily controlled. Another object is to provide a tunnel kiln with heating means in planes close together and means for moving "green" grinding wheels between said planes.

Another object of the invention is to provide an improved tunnel kiln. Another object is to provide a tunnel kiln for the vitrification of grinding wheels or other articles of the same general size range, which will be smaller and less costly to build. Another object is greatly to shorten the length of time required in vitrifying grinding wheels and other articles. Another object is to obtain higher efficiency in heating in a kiln. Another object is to heat "green" articles more uniformly and to anneal them better. Another object is to provide a kiln of greater efficiency and which gets the heat to and through the articles evenly, avoiding large heat differentials. Another object is to provide a kiln which will anneal each article at the ideal rate (based upon the best available calculations at the time) and which will produce vitrified articles having little or no strain and which are thus far stronger than previously available commercial articles. Another object is to provide a highly efficient and easily operated continuous kiln. Another object is to eliminate cars with wheels or the like in a tunnel kiln. Another object is to provide a tunnel kiln and equipment therefor in which everything passing through the firing zone and in the firing zone is made out of non-metallic refractory material, thus eliminating sand seals and the like and reducing the height and the mass of the kiln. Another object is to provide a kiln to vitrify grinding wheels and other ware through which nothing is passed excepting the ware and refractory batts supporting the ware. Another object is to reduce the cost of operating a tunnel kiln both for repairs and for labor.

Another object is to provide a tunnel kiln and operating mechanism, in which everything in or near the tunnel is entirely refractory. Another object is to provide entirely refractory ware conveying apparatus together with propelling mechanism therefor which is thoroughly reliable in operation.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

Figure 14:
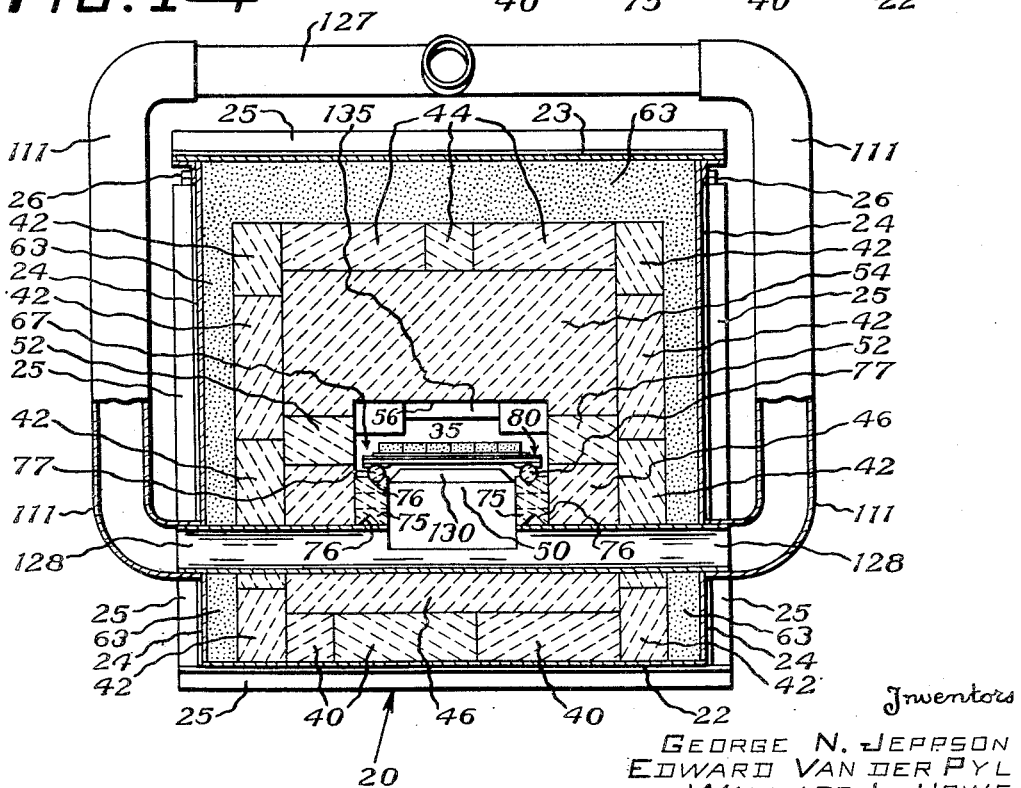

In the accompanying drawings illustrating a tunnel kiln and apparatus for molding and pressing grinding wheels:

Figure 1A is a sectional view of a conventional mold for pressing a grinding wheel, Figure 1B is a sectional view of a mold and pressing apparatus which is preferably used in the method of and to produce the article of this invention, Figure 2 is a side elevation of the kiln, Figure 3 is a fragmentary vertical central sectional view on an enlarged scale of the entrance end and preheating zone of the kiln showing also the propelling or charging mechanism for intermittently propelling the batts through the kiln, Figure 4 is an elevation of the front end of the batt propelling ram, the view being taken from the line 4—4 of Figure 3 looking in the direction of the arrows, Figure 5 is a fragmentary vertical central sectional view of the kiln showing the heating zone and parts of the preheating and annealing zones, the scale being the same as that of Figure 3, Figure 6 is a plan view of a pair of series of refractory rods upon which the batts rest and are propelled in the kiln tunnel, showing a couple of batts thereon, the view being on a larger scale than that of Figures 3 and 5, Figure 7 is a fragmentary vertical sectional view of the kiln showing the annealing zone and exit end, the scale being the same as that of Figures 3 and 5, the view also showing part of the receiving table in elevation, Figure 8 is a fragmentary elevation of a batt and a cross sectional view of a refractory rod on a scale considerably larger than that of Figure 6, Figure 9 is a view partly in axial section and partly in elevation of a refractory air delivery tube and hose connected thereto, on a large scale, Figure 10 is a fragmentary side elevation of a pair of batts showing the interlocking thereof, on a scale larger than that of Figure 8, Figures 11, 12, 13 and 14 are transverse (nearly vertical) sectional views through the kiln taken respectively on the lines 11—11 of Figure 3, 12—12 of Figure 5, 13—13 and 14—14 of Figure 7, on the same scale as these figures, Figure 15 is a graph of the movement of the ware (wheels) through the kiln showing the temperature of the kiln at each point in the tunnel.

Vitrified grinding wheels according to the invention may be made out of any refractory abrasive and any vitrifiable bond. The abrasive should be refractory so that it will not melt or fuse during the vitrifying operation. The temperature of vitrifying is dependent upon the particular bond used, and the abrasive is refractory for the manufacture of a wheel with a particular type of bond if the abrasive will not melt or fuse during the vitrification of such bond.

Consequently the abrasive can be diamond since vitrifiable bond for the manufacture of diamond grinding wheels is now known. A good example thereof is disclosed in the U. S. patent to Lombard and Milligan, No. 2,309,463. However grinding wheels according to the invention will be made in greater quantities with various varieties of alumina and with silicon carbide. Both of these are refractory. Varieties of alumina include emery, which is a natural alumina but relatively impure, corundum, which is a natural alumina but considerably purer than emery, and the products of the electric furnace. The products of the electric furnace in turn include the so-called "regular" alumina which is a brown variety about 95% pure, the white porous variety which is made by fusing chemically precipitated alumina, and newer types such as alumina made in discrete crystals as disclosed in U. S. Patent Re. 20,547 to Ridgway.

Varieties of silicon carbide include the ordinary black variety and the relatively pure green variety. The invention however is not limited to the use of diamonds, alumina and silicon carbide since any other refractory abrasive may be used.

The vitrifiable bond may be a mixture of clays and rocks, or a single clay and a single rock, or all clay or all rock, or frits may be used. As an example 20 parts of ball clay and 50 parts of Albany slip clay and 30 parts of feldspar, all by weight, are thoroughly dried, crushed, ground and screened. We may use the above or we may use more recently developed bonds as to which we will refer to the patents which describe them. U. S. Patent No. 1,829,761 to Saunders, Milligan, and Beecher granted November 3, 1931, describes an excellent vitrifiable bond especially for the manufacture of wheels with fused alumina abrasive. U. S. Patent No. 2,158,034 to Milligan and Lombard dated May 9, 1939, describes an excellent bond for the manufacture of wheels using silicon carbide abrasive. U. S. Patent No. 2,309,463 has already been mentioned as describing an excellent bond mixture for the manufacture of wheels with diamond abrasive. Many other bond mixtures for the manufacture of vitrified bonded abrasive products will be found in the patent literature, and we are not limited therein since any vitrifiable bond may be used.

With regard to the quantity of bond to be used, this depends upon the grit size of the abrasive and structure of the grinding wheel to be achieved. Full instructions for the manufacture of abrasives of closely controlled structure are set forth in the U. S. patent to Howe and Martin, No. 1,983,082 dated December 4, 1934. Accordingly, while the quantity of bond is certainly an important matter, this is a variable function of the volume percentage of abrasive and bond and is now well known to the art, so in practicing the present invention we use an amount of bond as desired to produce the desired structure. The relative volume percentages of abrasive, bond and pores depend not only on the weight percentage of abrasive and the weight percentage of bond but also on the amount of compacting of the mixture of abrasive and bond. This is a function of the molding technique and may be controlled as will shortly appear.

For the manufacture of grinding wheels and other abrasive bodies manufacturers now generally prefer the dry granular mix technique. This involves wetting the abrasive grains with a liquid, usually water in which is dissolved some organic material such as dextrine to make the water sticky. Then the bond in dried powdered form is slowly added to the wet abrasive while churning the abrasive to cause the bond to be evenly distributed throughout the mass. To perform this operation one can use a rotating container in which is located a stationary implement much resembling a plow. After a while the wet abrasive will have picked up all the powdered bond, and every granule of abrasive will be coated on all sides with bond. Such a mixture is frequently referred to as a dry granular mix, the word dry meaning that the mixture is dry to the touch although it does contain some water.

Referring now to the drawings, for molding and pressing a wheel we may use the apparatus illustrated in Figure 1A. This involves a press, such as an hydraulic press, the details of which need not be described herein. Such a press has a bottom platen 1 which is stationary and an upper platen 2 which is movable towards and away from the stationary platen 1. We provide a mold comprising a mold band 3 in the form of a hollow cylinder of steel, a mold arbor 4, which is a cylindrical piece of steel, and a pair of mold plates 5 each of which is shown as a cylindrical ring of steel. For the manufacture of various shapes of grinding wheels the shapes or relative dimensions of the mold band, the arbor and the plates will vary as is known in the art, and other materials may be used although steel is preferred. This mold is filled with a dry granular mix 6 and in Figure 1A the mold is ready for the pressing operation. Pressing should preferably be done to give a predetermined and fixed volume of the pressed article as distinguished from a predetermined or fixed pressure exerted and we therefore show stops 7 which may be simply blocks of iron or steel to limit the pressing operation. However so far as the present invention is concerned pressing may be done to a fixed pressure.

When the upper platen 2 is moved downwardly, the mix 6 will be compressed. This forms the mix into a so-called "green" wheel. This green wheel is then removed from the mold in a manner known to the art and, after baking to remove most of the water, is ready for firing in the kiln of the invention. As the result of firing in accordance with this invention, a superior grinding wheel is produced as will be more fully explained hereinafter.

While, so far as certain features of the invention are concerned, the wheels may be pressed as above described with apparatus such as illustrated in Figure 1A, we prefer to use molding and pressing technique which will now be explained by reference to Figure 1B. Thereby still better wheels can be produced. Referring now to Figure 1B, there is therein shown a press comprising a base $a$ having integrally formed thereon a hollow cylinder $b$ in which is located a piston $c$ having a piston rod $d$. The piston rod $d$ extends through a cylinder head $e$ which is connected by rods $f$ to a plate $g$ in the center of which there is a hollow cylinder $h$ which may be integral with the plate $g$. Through the bottom of the cylinder $h$ extends a piston rod $i$ on which is a piston $j$ located in the cylinder $h$. A cylinder head $k$ closes the top of the cylinder $h$.

Surrounding the rods $f$ are sleeves $l$ and $m$ which serve to hold apart the head $e$ and the plate $g$ and which also position and secure a plate $n$ through which the rods $f$ pass. This entire structure including the head $e$, the plates $g$ and $n$, the rods $f$ and the sleeves $l$ and $m$ is secured together by nuts $o$ on the ends of the rods $f$. The head $e$ is secured to the cylinder $b$ as by being screwed thereon. Thus it will be seen that the cylinders $b$ and $h$ and the plate $n$ are rigidly positioned in fixed spaced relation. The cylinders $b$ and $h$ are coaxial.

Fixed in the plate $n$ and located coaxial with the cylinders $b$ and $h$ is a cylindrical mold band $p$. It may be secured in place by a press fitted ring $q$ at the top and by a press fitted ring $r$ at the bottom, the ring $r$ having an integral bar $s$ diametrically across and under it for a purpose to be explained. Fitting in the mold band $p$ and above the bar $s$ is a bottom mold plate $t$ having a central hole through which passes a mold arbor $u$. At the upper end of the mold band $p$ is a top mold plate $v$. This mold plate $v$ is of a size and shape to enter the mold band $p$ and to form a close fit therewith. The mold plate $v$ likewise has a central hole $w$ into which the arbor $u$ may extend. The arbor $u$ is a fixed arbor since it has a reduced portion $x$ which is pressed fitted into a hole in the bar $s$.

The mold plate $t$ moves with the piston rod $d$. In this illustrative embodiment of this invention the mold plate $t$ is formed as an integral part of a pair of integral extensions $y$ of a plate $z$ which is removably secured to a plate $aa$. The plate $aa$ is connected to the piston rod $d$ by means of a pair of half collets $bb$ which are suitably secured to the plate $aa$ and which fit in a groove $cc$ formed in the piston rod $d$. Thus, the mold plate $t$, which in shape is a disc with a hole in it, moves whenever the piston rod $d$ moves but the bar $s$ which holds the arbor $u$ is unaffected by movement of the plate $t$ since it is located between the extensions $y$. To mold other sizes of wheels the mold plate $t$ with the plate $z$ and the extensions $y$ may be changed for similar parts of a different size.

The mold plate $v$ is removably secured to a plate $ee$ which is fastened by a pair of half collets $ff$ located in a groove $gg$ of the piston rod $i$, the collets $ff$ being suitably secured to the plate $ee$. The mold plate $v$ can readily be replaced with one of a different size if desired, and the mold band $p$ can likewise be changed. Thus whenever the piston rod $i$ moves, up or down, the mold plate $v$ moves.

The movement of the mold plates $t$ and $v$ is preferably limited to fixed distances. Thus, we provide a pair of rods $hh$ secured to the plate $aa$ and passing through the plate $n$ which will contact the plate $ee$ to stop the mold plate $t$. Similarly, we provide a plurality of short rods $ii$ secured to the plate $ee$ which will engage the plate $n$ and stop the mold plate $v$. Since, during the pressing operation, the plates $aa$ and $ee$ are approaching each other, while the plate $n$ is stationary, the space between the ends of the rods $hh$ and the plate $ee$ is twice as long as the space between the rods $ii$ and the plate $n$.

We provide hydraulic pressure connections to operate this press and mold. As shown in Figure 1B, a pipe $jj$ which is connected to a source of fluid under pressure branches into pipes $kk$ and $ll$. The pipe $kk$ is connected by a four-way valve $mm$ to a pipe $nn$ which leads to the bottom of the cylinder $b$. The top of the cylinder $b$ is connected by a pipe $oo$ to a shut off valve $pp$ which is connected by a pipe $qq$ to the top of the cylinder $h$. The bottom of the cylinder $h$ is connected by a pipe $rr$ to a four-way valve $ss$ which is connected by a pipe $tt$ to an exhaust pipe $uu$. The top of the cylinder $b$ is further connected by a pipe $vv$ to a shut off valve $ww$ which is connected by a pipe $xx$ to the four-way valve $mm$. The top of the cylinder $h$ is further connected by a pipe $yy$ to a shut off valve $zz$ which is connected by a pipe $aaa$ to the four-way valve $ss$. The four-way valve $mm$ is further connected by a pipe $bbb$ to the exhaust pipe $uu$.

Figure 1B shows the mold band $p$ having been filled with a mixture of abrasive and vitrified bond 6 such as a dry granular mix above explained. With the various valves in the position shown the piston $c$ will rise and the piston $j$ will move down. These pistons and the mold plates $t$ and $v$ connected to them will move at exactly the same rate. Stated in another way, the upper face of the plate $t$ and the lower face of the plate $v$ will always be the same distance from a mid plane of the mold band $p$, which mid plane is half way between such faces at the start of the operation. Such mid plane is parallel to the faces of the plates $t$ and $v$ and is perpendicular to the axis of the mold. The reason why the pistons $c$ and $j$ will move at the same rate with the results indicated, is because the piston $j$ is driven by fluid exhausted from the upper part of the cylinder $b$ and the area of the piston $j$ is equal to the area of the piston $c$ minus the cross sectional area of the piston rod $d$.

Because a dry granular mix of abrasive and bond is not the same as a liquid, the pressure in any mold is different at different places. The internal friction of an ordinary dry granular mix of abrasive and vitrified bond is considerable. Using the mold of Figure 1A, and assuming that we are molding a wheel of substantial thickness, say one whose thickness is more than fifty times the average diameter of its abrasive grains, the results will be variable and the wheel will not be homogeneous. In general, using such a dry granular mix, the interior is always softer, that is it "grades softer." Furthermore the top of the wheel as molded will generally be harder (grade harder). This is because only the top plate 5 moves relative to the adjacent mass of the mix 6 and relative to the arbor 4.

On the other hand, using the apparatus of Figure 1B, both plates $t$ and $v$ move relative to the adjacent mass of the mix and relative to the arbor $u$. The motion of the mold plates relative to the mold band is also of importance where the wheel has a thickness which is of the same order of magnitude as its diameter or a greater thickness. In the case of a conventional mold such as that of Figure 1A, the motion of the mold plates 5 relative to the mold band 3 is variable and indeterminate. Sometimes the mold band 3 drops down before pressing, sometimes it remains stationary until positively forced down by the upper platen 2 and stops 7 and sometimes it goes down at an indeterminate rate, due to the friction of the top part of the mix which is being pressed down. Often the stops 7 are omitted or arranged differently than shown in Figure 1A. But in the improved mold apparatus and method of Figure 1B, both of the plates $t$ and $v$ move relative to the adjacent mass of the mix and relative to the arbor $u$ and relative to the mold band $p$ and as they move their faces are always at equal distances from a given plane of the mold band $p$ and of the arbor $u$. Such plane can be called a median plane and is perpendicular to the axis of the mold band $p$ and of the arbor $u$. Thereby an equal pressing is achieved and the wheels will grade the same on the top side and the bottom side (as molded).

After a green wheel is pressed in the mold of Figure 1B, it may readily be removed therefrom as follows: The valve $pp$ should be closed to hold the piston $c$ from further movement. The piston $c$ has already been stopped by engagement of the rods $hh$ with the plate $ee$, but the plate $ee$ is going to be moved. Next the valve $ss$ should be reversed and then the valve $zz$ should be opened. This will reset piston $j$ to the limit of its movement, therefore lifting the plate $ee$ and the mold plate $v$. Now the valve $pp$ should be opened which will cause the piston $c$ to rise and the mold plate $t$ will eject the pressed green wheel from the mold band $p$. This upward movement of the piston $c$ carries the mold plate $t$ to the level of the top of the ring $q$. The pressed wheel may now easily be removed from the apparatus with a pusher.

The next step is to reset the mold apparatus for filling. First the valves $zz$ and $pp$ should be closed to hold the piston $j$. Then the valve $mm$ should be reversed and the valve $ww$ opened. This will move the piston $c$ downward a full stroke. The mold cavity in the mold band $p$ may now be filled with a dry granular mix 6 which can be poured into place using a funnel with a bent spout. Now, to set the apparatus into the position of Figure 1B, close the valve $pp$ or keep it closed, place the valve $ss$ in the position shown in Figure 1B, and manipulate shut off valve $zz$ to allow fluid to enter the upper part of the cylinder $h$ until the mold plate $v$ is about to enter the mold band $p$, as clearly shown in Figure 1B. Then, when all the valves are reset to the position shown in Figure 1B, another mixture 6 will be molded, which may then be stripped from the mold as already described. In this way quantities of green wheels are produced which, after drying, are ready to be vitrified in the kiln which will now be described.

Referring first to Figures 2, 3, 5, 11, 12, 13 and 14 the kiln, which is generally indicated by the number 20, is mounted on a plurality of legs 21 which may be made of steel. As shown, the kiln 20 has the shape of a parallelepiped which is rectangular in cross section, but the ends need not be perpendicular to the top and bottom of the kiln 20 since it is inclined to the horizontal. The pitch of this inclination was actually about one foot in twenty-three, which is an angle of about 2° 28′. Preferably it should not be much less than say 2°, nor much greater than 8°. The purpose of the downward pitch, for in Figure 2 the right hand end of the kiln is the entrance end, is to drive more of the hot gases toward the entrance end of the kiln; some gases go to the annealing zone and this is desired.

Referring again to the aforementioned figures, the kiln may comprise sheet steel bottom plates 22, sheet steel top plates 23 and sheet steel side plates 24, all fastened together to form the elongated box like structure shown by means of many angle irons 25 as well as the upper portions of the legs 21 and tie rods 26, the foregoing metal parts being bolted together or welded together or partly bolted and partly welded as desired. Referring to Figure 3, an entrance end plate 30 partly covers the entrance end of the kiln and referring to Figure 7, an exit end plate 32 partly covers the exit end of the kiln; these plates likewise are preferably made of sheet steel and may be welded to angle irons 25; they do not cover the ends of the tunnel 35.

One of the features of the invention is the relatively small size of the kiln. While it may be profitably made in much larger sizes, the kiln actually built was 23 feet, 3 inches long, measured on the horizontal, and 2 feet 7 inches square in cross section measured between the insides of the sheet metal plates. The chief reason for the legs 21 was to place the tunnel 35 high enough for working convenience, the bottom of the exit end of the kiln being 2 feet above the floor and of the entrance end being 3 feet above the floor. This kiln can vitrify wheels up to eight inches in diameter and two inches thick. For larger wheels larger kilns should be constructed.

Still referring to the same figures, the kiln 20 contains a refractory lining which insulates and defines the tunnel 35. This lining may be constructed in a number of ways, but the illustrative embodiment herein described is highly practical, readily constructed and easily repaired. Thus we provide a refractory bottom formed of courses of bricks 40, refractory sides formed of courses of bricks 42, and a refractory top formed of courses of bricks 44. The bricks of these courses are preferably insulating bricks of any desired variety provided they are refractory enough to withstand the temperatures hereinafter mentioned. Silica bricks may be used with success.

We further provide a course of tunnel bottom bricks 46 having aligned pairs of rectangular grooves 48 in their upper surfaces thus forming at the bottom of the tunnel 35 a continuous groove on each side thereof extending from end to end of the tunnel, the grooves 48 being separated by ledge portions 50. We also provide a pair of courses of tunnel side bricks 52 which rest upon the sides of the tunnel bottom bricks 46 from the grooves 48 outwardly and upon these we mount a course of tunnel top bricks 54 which may have ceiling recesses 56 therein. The bricks 46, 52 and 54 may be made of the same material as the bricks 40, 42 and 44; they should be able to withstand the temperatures herein involved. The various bricks and courses of bricks may be secured to each other by suitable refractory cement such as 85% alumina fines with 15% ball clay, both to make the structure more rigid and to seal it better for retention of heat. Expansion gaps should be provided, and in Figures 3 and 5 we have shown gaps 58 and 59 between pairs of bricks 46 and also gaps 60 and 61 between sets of bricks 40. The several bricks of a given course are in general the same, but certain ones are drilled, others are cut away at certain places, and the end bricks may be mitered to fit the end plates 30 and 32 since the angles at the ends of the kiln are not right angles; the drawings clearly show these features and they will be more fully pointed out hereinafter. Between the side bricks 42 and the side plates 24 and between the top bricks 44 and the top plates 23 is a mass of loose refractory insulating material 63. We find that diatomaceous earth is satisfactory for this purpose.

Referring now to Figures 3, 5 and 7, the tunnel 35 of the kiln 20 has a preheating zone 65, a heating zone 66 and an annealing zone 67. As the green wheels enter and are moved through the tunnel 35 they first strike moderate heat, of the order of 200° C. at the entrance end, which is protected by an upper portal brick 70 and a lower portal brick 71 which are cemented to end bricks 54 and 46 respectively. Referring now to Figure 15, the temperature gradually rises as a green wheel moves through the preheating zone 65. The flat top of the curve is reached after the green wheel (ware) enters the heating zone 66. As shown this is about 1260° C. which is a practical temperature for the vitrification of the wheels under the special conditions involved which include a 46 inch heating zone and a speed of 23 feet 3 inches in 4 hours. The speed is practically 70 inches an hour. A particular piece of ware is consequently in the heating zone only about 40 minutes. The curve of Figure 15 likewise shows that the ware is subjected to a heat of 1200° C. and above for only about 46 inches which is 40 minutes of time. Vitrification at a top temperature of 1260° C. and for only 40 minutes at 1200° C. or above is extremely fast vitrification and is made possible by the features of the heating zone hereinafter described.

The preheating zone 65 is substantially 46 inches long, so the ware moves therethrough in about 40 minutes. Referring to the curve of Figure 15, the rate of temperature rise in the preheating zone is about 17.5° C. per minute. The temperature of the ware, of course, lags behind the temperature of the zone at any place, the ware starting at room temperature and being initially subject to a heat of 200° C., but the lag is not great due to the fact that thin batts are used and only a single layer of green wheels is placed on each batt in accordance with the preferred manner of using the kiln and carrying out the method of the invention. At all events preheating and vitrification heating at the rates and temperatures above specified can be successfully carried out in practice to produce vitrified grinding wheels which are not merely as good as but actually better than those heretofore made on a commercial scale.

The annealing zone is about 187 inches long which at 70" an hour represents about 2 hours and 40 minutes of time. From the curve of Figure 15 it will be seen that a very regular and even temperature drop occurs in this annealing zone. This produces a cooling of the ware at a steady rate, the ware of course being slightly hotter than the zone at any point. The ware reaches the exit end of the kiln at a temperature low enough (about 120° C.) so that there is no shock when it moves out into the room in which the kiln is located.

Referring now to Figures 11, 12, 13 and 14, we provide refractory supporting members 75 in the rectangular grooves 48 which collectively fill the corresponding groove 48 from end to end of the tunnel 35. Slight gaps are left between the members 75 for expansion. Each supporting member 75 has a V groove 76 in its top and bottom, the grooves on the bottom being chiefly to make these members symmetrical so that they will not warp during firing nor in use. In these V grooves 76 on the upper side we place refractory rods 77 which, as best shown in Figure 6, have tapered end portions 78. Referring now to Figures 6, 8 and 10 we provide ware carrying refractory batts 80 which are thin rectangular plates of refractory material having thickened ends 81 with grooves 82 on the under side extending across the batts and locating the batts on the rods 77. The upper side of each batt 80 is flat and has a layer 83 of silica. The sides of the batts 80 have respectively projections 84 and grooves 85 so that the batts are interlocked together in the tunnel 35. This keeps any batt from riding over the batt in front and also has other advantages which will be hereinafter pointed out.

The supporting members 75 and the rods 77 are preferably made of self-bonded aluminum oxide. Thus they are highly refractory and resistant to wear. The batts 80 are preferably made of vitrified silicon carbide which is still more refractory and wear resistant. The silica layers 83 are formed by placing layers of silica cement on the batts and then vitrifying. These layers 83 prevent contamination of the ware, especially when the ware is made of aluminum oxide abrasive particles with ceramic bond as is frequently the case. The rods 77 are preferably ground to produce smooth accurate cylindrical surfaces and the grooves 76 are also preferably ground.

We have found that batts 80 having green wheels and partly vitrified wheels and vitrified wheels undergoing annealing in a long continuous line can be forced through the tunnel 35 by a thrust at the entrance end, and the batts stay in perfect alignment, nothing is broken and the ware is not disturbed in any way. The grooves in the batts 80 by coaction with the rods 77 help to maintain the batts parallel and in alignment. The thrust is intermittent and is applied to each batt as it enters the kiln—the new batt transmits the thrust to the next in line and so on, each batt transmitting the thrust to the one in front of it until the batt at the tunnel exit end is reached. This means of propelling batts through the tunnel 35 is entirely successful despite the fact that no rollers or metal parts are used. The tapered end portions 78 have proved effective in preventing the batts from catching on the rods 77 despite the fact that the rods are not continuous. These rods 77 can be replaced in the tunnel 35 even when the kiln is hot, for they can be pushed along the grooves 76 and will not catch in the joints between supporting members 75. Since the rods 77 are round they have many "sides" or areas for successively taking the wear, new areas being placed uppermost merely by turning the rods. An unexpected and surprising fact about the action of the batts 80 on the rods 77 is that the wearing of the rods 77 is greater in the annealing zone 67 than it is in the heating zone 66.

Referring now to Figure 12, we provide heating means in the heating zone 66 just below the batts 80 and just above the batts 80. While so far as certain features of the invention are concerned the heat might be provided by muffles above and below the ware, we prefer to use electrical resistors, such as in the form of long resistor rods 90 of silicon carbide preferably having "cold ends" 91, that is ends of high conductivity so that the energy will be supplied where it is needed, in the heating zone 66 of the tunnel 35. Silicon carbide resistor rods which can be heated to around 1400° C. and will last for a reasonable time at this temperature are available on the market. The use of these resistor rods or any other refractory electrical resistor rods of adequate life presents the advantage that the heat is developed right in the heating zone of the tunnel and, in combination with the supporting members 75 and rods 77 for supporting the batts, permits the heat to be developed virtually as closely as desired to the wheels 92 supported by the batts 80. Heat is radiated directly downward from the upper resistor rods 90 upon the green wheels 92, while heat is radiated directly upward from the lower resistor rods 90 upon the under sides of the batts 80 which, as will be readily seen, are comparatively thin. This radiated heat represents more British thermal units than convection heat. Thus the wheels 92 are vitrified by heat directed upon the sides of the wheels rather than upon the periphery as in tunnel kilns heretofore used for vitrifying grinding wheels. The result has been the manufacture, according to this invention, of vitrified grinding wheels with no strain and which have high strength both as regards rupturing point in surface feet per minute and impact resistance to side blows.

The resistor rods 90 have terminals 93 at the outer ends of their cold ends 91, which terminals 93 are outside of the side plates 24. They are connected by suitable wiring to a source of electrical energy of high power and the heating zone 66 is maintained at the desired temperature by electrical heat controlling apparatus controlled by a thermocouple 95. We will not describe the electrothermal control means nor the thermocouples in detail since such are available on the market and are not per se the subject of this invention. However it may be noted that an electromotive force of 110 volts capable of delivering up to 30 kilowatts in three phase current was used, controlled from a Leeds and Northrup heat regulator by means of the thermocouple 95. Each resistor rod 90 was across one phase of the power. The actual voltage across each rod varies from 30 volts to about 110 volts depending on the age of the rod, and the usual power input for the total heating unit was around 18 kilowatts.

The radiant heat generated by the lower bank of resistor rods 90 passes rapidly through the batts 80 because they are made of silicon carbide which has relatively high heat conductivity. In order further to increase the rate of heat transfer, the batts 80 have a dense structure and are thin. They transfer heat more rapidly than the green wheels 92 which, being grinding wheels, are porous, and furthermore green ware transmits heat more slowly than vitrified ware. Therefore the lower sides of the wheels 92 can be, in this kiln, heated at practically the same rate as the upper sides of the wheels 92.

In the kiln of this invention wheels have been observed in the heating zone 66 to have red hot bottom faces and top faces, of the same degree of redness with a central zone of less redness, showing that the heat was transmitted in a uniform flow from top and bottom. Likewise, in the annealing zone 67 a red hot interior has been observed in the wheels with darker underside and top side, the color of the top and bottom being the same. This evidence shows ideal heating and annealing in contradistinction to conditions previously met with involving temperature gradients radially of the wheels. In each of the above cases the color change from the outside to the inside was gradual.

Referring again to Figure 12, the resistor rods 90 are supported by refractory insulating sleeves 98 which extend through the side plates 24 and through the loose refractory insulating material 63 and into the kiln side bricks 42. In the heating zone 66 there are three courses of tunnel side bricks from top to bottom, Figures 12, 52a, 52b and 52c on each side of the tunnel 35. The upper rods 90 extend through holes in the side bricks 42 and through holes in the tunnel side bricks 52a and then across the upper part of the tunnel 35 just below the tunnel top bricks 54. The lower rods 90 extend through holes in the side bricks 42 and through holes in the tunnel side bricks 52c and through oversize holes 100 in the refractory supporting members 75 and just above the tunnel bottom bricks 46, the ledge portions 50 being omitted in the heating zone 66. All of the members 75 may have holes 100 to reduce thermal strains. The boundaries between the cold ends 91 of the resistor rods 90 and the central heating portion 101 are indicated by vertical lines in Figure 12 from which it can be seen that the bricks contain only the cold ends 91 of the resistor rods 90. Also it will be seen that the central heating portions 101 of the resistor rods 90 extend practically from side to side of the rectangular (in cross section) heating zone of the tunnel 35.

It is thus possible to eliminate car wheels in the kiln and there are many advantages in so doing. In the first place it permits the lower rods 90 to be placed close to the bottoms of the batts 80, and in the second place everything in the heating zone 66 can be made of refractory material whereas the use of wheels usually involves either metal wheels, metal axles, metal bearings or metal sand seals or all of these. Furthermore the particular supporting means for the batts shown and described involving the refractory members 75 with grooves 76 and refractory rods 77 permits the batts 80 to be propelled through the tunnel 35 without any moving parts or other actuating mechanism therein other than the batts and ware which are propelled. This is a great advantage as it permits the construction of a compact kiln with a small volume heating zone 66. Large volume heating zones involve convection currents and undesired temperature differences. The present construction furthermore separates the various zones of the tunnel 35 including the heating zone 66 into two parts respectively above and below the batts (as parts 66a and 66b of zone 66, see Figure 12) for the members 75 extend from the rods 77 to the sides of the tunnel, the batts 80 extend from member 75 to member 75 and the batts are in contact with each other. This cuts down convection and gives controlled heating and vitrification. Furthermore, if desired, the part 66b of zone 66 can be heated hotter than the part 66a of zone 66 to compensate for the slower heat transfer through the batts 80 than by direct radiant heat.

Referring now to Figure 2, the angle irons 25 are cut away (on both sides of the kiln) at the heating zone 66 so that they will not interfere with the resistor rods 90, and longitudinal angle irons 25a are welded or fastened to the side plates 24 above and below the terminals 93 of the rods 90.

The green wheels 92 usually contain organic material as a temporary binder. This is burned out during the passage of the wheels 92 through the preheating zone 65 and the heating zone 66. This organic material leaves no ash. In order to burn out the organic material air is introduced into the tunnel 35. In order to remove the gases of combustion and in order to maintain the temperature gradient in the tunnel 35 at or close to the gradient shown in the graph, Fig. 15, we provide ducts, piping and dampers.

Referring now to Fig. 2, a smoke stack 105 is provided which may extend upwardly through the roof of the building and it may have a rain cap 106. The smoke stack 105 is connected to a long, slanting pipe 107, which is located above the kiln 20, as shown. The particular arrangement adopted involves four feeder pipes 108, 109, 110 and 111. The feeder pipe 108 is connected to the tunnel 35 at the entrance end of the preheating zone 65. The feeder pipe 109 is connected to the tunnel 35 far out in the annealing zone, and the feeder pipes 110 and 111 are connected to the tunnel 35 near the exit end of the annealing zone 67.

Referring to Figs. 2 and 3, a damper 112 controls the flow of hot gases through the feeder pipe 108. Referring to Fig. 2, a damper 113 controls the flow of hot gases through the feeder pipe 109. Referring to Figs. 2 and 7 a damper 114 controls the flow of hot gases through the feeder pipe 110 and a damper 115 in the long pipe 107 controls the flow of gases from the feeder pipes 111.

Referring now to Fig. 11, which is a cross sectional view looking towards the entrance end of kiln 20, the feeder pipe 108 is connected to a large duct 116 which has legs 117 straddling the kiln 20, some of the side bricks 42 being omitted at this location and a pair of top bricks 44 being mitered as shown. This duct 116 and its legs 117 may be made of sheet steel. The legs 117 are connected to the upper level of the tunnel 35 by means of metal pipes 118, and to the midlevel of the tunnel 35 by metal pipes 119 and to the lower level of the tunnel 35 below the batts 80 by metal pipes 120. These metal pipes 118, 119 and 120 extend through holes in the bricks 54, 52 and 46 and, in the case of the pipes 120, also through holes in the refractory supporting members 75. It will thus be seen that the above construction provides for the exhaust of a considerable quantity of hot combustion gases and hot air from the heating zone 66 and preheating zone 65, but this exhaust is under control by means of the damper 112.

Referring now to Fig. 13, this illustrates the construction not only just below the feeder pipe 110 where the section is taken, but also just below the feeder pipe 109. A substantially vertical passage 122 is formed through each of the tunnel top bricks 54 at the two locations involved and connecting pipes 124 of metal are located in slots 125 in the bricks 44 connecting the vertical passages 122 to the feeder pipes 109 and 110. These vertical passages 122 extend from the upper middle of the tunnel 35, as clearly shown in Fig. 13. The passage 122 which leads to the feeder pipe 109 can remove some hot air and combustion gases, while the passage 122 which leads to the feeder pipe 110 can remove some hot gas, which is mostly air. In practice the damper 113 has been kept closed most of the time to maintain the desired temperature gradient, as shown in Fig. 15.

Referring now to Fig. 14, which is a cross sectional view looking toward the exit end of the kiln, the feeder pipes 111 extend vertically outside the kiln and are connected to the long, slanting pipe 107 by a horizontal overhead pipe 127 and are connected at their lower ends by a horizontal pipe 128 extending through the side plates 24, kiln side bricks 42 and a large groove in the tunnel bottom brick 46. The horizontal pipe 128 is cut away at the upper side between the supporting members 75 to allow hot air under the batts 80 to escape through pipe 128, feeder pipes 111 and horizontal overhead pipe 127 to the long slanting pipe 107 where the amount of air passing is controlled by the damper 115. Referring to Fig. 7, a thin brick 130 located on the tunnel bottom bricks 46 near the exit end of the tunnel 35 almost blocks off the tunnel 35 under the batts 80, so that control may be readily effected by the damper 115.

As heretofore stated, the entrance end of the tunnel 35 is protected by an upper portal brick 70 and a lower portal brick 71, which together reduce the size of the entrance end so that it provides clearance for the batts 80 and the ware thereon and not much more, and as there is (during operation) always a batt with ware in the entrance little heat escapes from the entrance end. At the exit end of the tunnel 35 there is similarly provided an upper portal brick 135 which, with the brick 130, pretty much closes the exit end of the tunnel leaving just enough room for the batts 80 and the ware thereon to emerge, and again a batt with ware on it is, during operation, partly blocking the orifice. Additionally a sliding door 137 made of iron may be adjustably positioned in a frame 138 by means of a handle 139 further to limit the orifice, or to enlarge it when larger wheels are being fired.

Referring to Figures 3 and 9 we provide a pair of refractory tubes 141 having one end closed but with angular slots 142 in one side which extend through the upper portal brick 70 into the tunnel 35 and are supported therein by refractory ledges 145. These tubes 141 are connected to hose pipes 146 which are connected to a source of air under pressure. Thus air is supplied to the preheating zone 65 to support combustion of the organic material in the green wheels. This supply of air is carefully regulated to maintain the desired temperature conditions in the preheating zone 65.

In order that the operator may have full information upon which to adjust the dampers and the supply of air, we provide a number of thermocouples 150 extending into the top and bottom of the tunnel 35. As shown in Figure 2 there may be 16 (more or less) of these, strategic locations therefor being indicated by the figure. Referring to Figures 3, 5 and 7 each top thermocouple 150 extends through a refractory tube 151 which extends a little way into a kiln top brick 44 and also through the kiln top plate 23; each top thermocouple also extends through bores in the kiln top bricks 44 and the tunnel top bricks 54. The bottom thermocouples 150 extend through bores in the bricks 40 and 46. Likewise peep holes 155 may be provided through the tunnel side bricks 52b, kiln side bricks 42 and side plates 24, with sleeves 156 extending from the plates 24 to the bricks 42, whereby the temperature of the firing zone 66 may be checked with an optical pyrometer. These peep holes 155 are closed by plugs 158 when not in use. The several thermocouples 150, or certain selected ones, may be connected to automatic recording apparatus, to provide a record of temperature at selected locations.

We provide a ram 159 to push the batts with a steady stroke of measured length. This ram may be operated by any suitable mechanism; we have found it convenient to employ a cylinder and piston unit using the city water supply for power.

Referring now to Figures 3 and 4, the ram 159 is a disc shaped piece of metal set on edge with part of the bottom cut off and having a screw threaded hub 170 by means of which it is screwed onto the threaded end 171 of a piston rod 173 which extends through a cylinder head 174 into a cylinder 175. The cylinder head 174 has a suitable stuffing box 176 to minimize leakage, which may be tightened by a stuffing box nut 177. The cylinder 175 is further provided with a solid cylinder head 178. Channels 179 and 180 in the heads 174 and 178 respectively admit and exhaust fluid (as water) to drive a piston 181 on the rod 173. This is the mechanism for intermittently propelling the batts 80 through the kiln 20. The acutation of the piston 181 will be later described.

The cylinder 175 may be supported in any suitable manner, but as herein shown a large box structure 185 made of sheet metal has a ledge 186 which supports the cylinder head 174 while a post 187 supports the cylinder head 178.

The box 185 is supported by legs 191 and besides supporting the cylinder head 174, it constitutes means for partially protecting the entrance end of the kiln from loss of heat. Access may be gained to it, however, by means of a door not shown in order to place a batt on a table 193 located in and fastened to the box 185.

It is contemplated that automatic mechanism may be provided to move the batts, one after another, at timed intervals, into position to be forced into the tunnel 35 by the ram 159. In a co-pending application is fully disclosed such mechanism. However so far as the features of the kiln are concerned, the batts may be placed in front of the ram 159 in any manner, such as by hand, and we therefore herein disclose the table 193 which as shown in Figure 4 is equipped with an aligning stop 195 so that the batt can be placed square to the thrust of the ram 159 and in alignment with the batts already in the tunnel 35.

Still referring to Figure 3, a pair of bricks 200 are supported by the kiln 20 at the entrance end of the tunnel 35, and these bricks 200 support refractory members 75 which support rods 77 that extend well into the box 185. The table 193 extends to and between this first pair of rods 77, which pair is partly within the tunnel 35 and partly within the box 185. The surface of the table 193 is slightly inclined to the horizontal and it is below the plane defined by the tops of all the rods 77 to the extent of the depth of the grooves 82. As shown in Figure 4, the bottom of the ram 159 is practically in contact with the table 193. Each stroke of the ram 159 will advance the batts 80 in the tunnel 35 by the distance of the width of one batt regardless of the fact that the stroke of the ram 159 may be much greater than this distance, for the reason that the operator adds only one batt at a time to the train of batts in accordance with the preferred method of operating the kiln. Conversely if the operator should at any time place two batts upon the table 193, then the batts in the tunnel 35 would be advanced by a distance equal to the width of two batts.

In accordance with the copending application above referred to, it is contemplated that automatic apparatus will cause the ram 159 to be actuated at accurately timed intervals and in coordination with the batt feeding mechanism. However so far as the features of the kiln are concerned, the ram can be caused to move by manual control. As shown in Figure 3, water under pressure, derived from any suitable source, is conducted by a pipe 205 to a hand operated valve 206 and water may be exhausted from the system through the valve 206 to the sewer by way of a pipe 207. From the valve 206 a pipe 208 branches into a pair of pipes 209 and 210 in the first of which is a throttle valve 211 and in the second of which is a check valve 212. The pipes 209 and 210 merge into a pipe 213 which is connected to the channel 179. The valve 206 on the other side is directly connected to the channel 180 by means of a pipe 214. With the valve 206 in the position shown, the piston 181 is forced back in the cylinder 175 and the speed of the return stroke of the ram 159 caused by rearward motion of the piston 181 is unaffected by the throttle valve 211 because the fluid can pass through the check valve 212. When the valve 206 is turned the other way, fluid enters the cylinder 175 by way of the pipe 214, and the piston 181 is moved forward causing the ram 159 to contact and move a batt 80 on the table 193, and this motion is at a slow and controlled rate due to the fact that fluid exhausting from the channel 179 has to pass through the throttle valve 211.

When starting the kiln after it has been shut down and cooled off, it is best to feed it with batts 80 having dummy ware, meaning refractory pieces which have been fired. The dummy ware soaks up the heat and enables the operator gradually to bring the zones 65, 66 and 67 to the desired temperature gradients. If no dummy ware is used, the temperature gradients will change as the green ware is introduced. Dummy ware may consist of rectangular blocks of refractory material of about the same weight as a load of green ware and about the same specific heat. Once the temperature gradients are established the green ware may be fed to the kiln and will be given the proper heating cycle, and after about four hours all of the dummy ware is out. Every time a batt 80 is pushed into the tunnel 35 after it is full of batts, one is pushed out of the tunnel 35 at the exit end. Any suitable provision can be made for collecting the batts at the exit end of the kiln, and in the copending application there is disclosed a discharging conveyer for removing them from the line of batts. However they can be taken care of by means of a table 220 (Figure 7) supported by legs 221 and having rollers 222 so that the batts will simply move onto the table and can be moved along it by hand. The vitrified wheels 92 can be removed for shipment or storage at any time and the empty batts returned for reloading. The table 220 is convenient for holding hot batts and hot wheels until they have cooled sufficiently to be handled even without gloves. The table 220 preferably has bridging members 225 to space the gap between it and the end of the tunnel 35.

An advantageous feature of the invention resides in the use of relatively narrow batts 80 (those used being three and three-quarters inches wide, that is in the dimension lengthwise of the kiln) the gradual temperature gradients and the interlocking projections 84 and grooves 85 of the batts 80. Regular timed feeding of the batts will keep the various zones 65, 66 and 67 at the desired temperature gradients. It also assures that each piece of ware and each batt 80 will have the same heat treatment. Wide batts receive greater heat shock than narrow batts because they extend over a longer part of each zone. Refractory batts in general are rather subject to breakage from heat shock, but by using thin narrow ones we can operate this kiln with only an occasional batt breaking. This is where the interlocking of the batts serves to great advantage, because by doing this with the projections 84 and grooves 85 we find that a batt or even two successive batts can fracture in the kiln without disrupting the operation. The broken batt or batts are held up by the interlocking and the pressure due to the friction between batts 80 and the rods 77 and the thrust imparted by the ram 159. We therefore find that the kiln operates well with each batt mounted for sliding involving a substantial amount of friction.

Referring to Figure 2, the electrical rod resistors 90 are in two banks or planes. Referring to Figure 12, the upper rod resistors 90 provide substantially a plane of radiant energy directed upon the upper faces of the wheels 92 whose axes are nearly vertical. In order that there shall be room for ware upon the batts the distance from the plane of the tops of the rods 77 to the plane of radiant energy is preferably no less than one-quarter of the distance between the rods 77 and in order that the heat shall penetrate the wheels 92 rapidly this distance is preferably no greater than the distance between the rods 77 and preferably a good deal less as shown in Figure 12. The distance between the rods 77 (measured from center to center) is the same as the distance between the refractory supporting members 75 (measured between the apexes of the dihedral angles of the grooves 76).

On the other hand the rod resistors 90 should be located as close to the undersides of the batts 80 as possible consistent with mechanical strength of the refractory supporting members 75 and Figure 12 shows them substantially so located. It is preferred that they should be no lower than one-half the distance between rods 77 below the plane of the rods. Actually they are much closer than this as shown in Figure 12.

The kiln of the invention is quite capable of vitrifying grinding wheels in more than a single layer of such wheels upon the batts 80, but for the production of the strongest grinding wheels there should be no more than a single layer of green wheels 92 placed upon the batts 80. Likewise, in order that the heat shall penetrate into the wheels and heat them uniformly they should be placed on the batts with a flat face on the batt, that is with their axes perpendicular to the batt.

The rates of heating and cooling are functions of the size of the wheels being vitrified and of the grit size of the abrasive grains of such wheels. However, and referring now to Figure 15, for wheels up to eight inches in diameter the rate of rise of temperature as the green wheels move through the preheating zone or area 65 should be from 200° C. to 900° C. in not less than 35 minutes. It is preferable that the rate of heating shall not vary more than 20% in any 10 minutes as compared with any other 10 minutes. The temperature rise from 900° C. to 1200° C. should take at least 12 minutes. The wheels should be maintained at above 1200° C. in the heating or vitrifying zone or area for at least 20 minutes and the wheels should be annealed in the annealing zone or area by causing them to cool from 1200° C. to 200° C. in not less than 100 minutes. It is also preferable that the rate of cooling in the annealing zone should not vary between any two periods of 10 minutes more than 20%. Operating with such a vitrifying cycle not only is a high rate of production achieved but very strong wheels without strain are produced. The graph of Figure 15 and the figures hereinbefore given show the preferred temperature gradients and peak temperature for wheels up to eight inches in diameter. For larger wheels the length of time that the wheels are in the respective zones will be greater, but for any given size of wheel the kiln of the present invention will vitrify the wheels in a very short time and the wheels will have no strains.

It will thus be seen that there has been provided by this invention a thoroughly practical and efficient kiln for vitrifying grinding wheels and other ware in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. A tunnel kiln for the vitrification of grinding wheels and like ware comprising a refractory structure forming a long tunnel, a continuous refractory rod support extending from end to end of the tunnel and comprising spaced portions so that the space between the portions can contain heating means, radiant heat supplying means at a locus in said tunnel both above and below the plane of the support, a ram at one end of the tunnel and means to operate said ram, whereby a multiplicity of refractory batts having portions to fit the support can be introduced, one by one, into the tunnel and will slide on the support carrying "green" ware slowly through the tunnel, and the ware can be heated from above the support and through the batts, from below the support.

2. A tunnel kiln comprising refractory bricks forming a structure which has one dimension of great length compared with the others, said structure having a tunnel in the direction of said dimension, a pair of sets of parallel refractory rods in said tunnel, a continuous shelf of refractory batts resting on said rods and slidable thereon, electrical rod resistors across the rods above them and also below them and a ram whereby to propel batts in a long line of batts on said rods through said tunnel and between said electrical rod resistors.

3. In a kiln, a refractory structure forming a long tunnel, a refractory support in said tunnel comprising a pair of sets of refractory rods each set being parallel to the other set and there being a substantial space between the sets, electrical rod resistors above and across the pairs of sets of refractory rods, electrical rod resistors below and across the sets of refractory rods, said electrical rod resistors being spaced from the refractory rods by a distance no greater than the distance between the sets.

4. In a tunnel kiln, a refractory structure forming a long tunnel, a plurality of electrical rod resistors extending through and across said tunnel in the lower part thereof, a plurality of electrical rod resistors extending through and across said tunnel in the upper part thereof, the first plurality of electrical rod resistors being opposite to the second plurality of electrical rod resistors and all thereof being located in a zone spaced from the ends of said tunnel said zone being the heating zone of the tunnel, a straight refractory rod support for batts on one side of the tunnel locaated between the electrical rod resistors in the lower part of the tunnel and the electrical rod resistors in the upper part of the tunnel, a straight refractory rod support for batts parallel to the first named straight refractory rod support for batts located on the other side of the tunnel and also between the electrical rod resistors in the lower part of the tunnel and the electrical rod resistors in the upper part of the tunnel, and refractory batts resting upon said supports and slidable therealong.

5. A tunnel kiln comprising a refractory structure forming a long tunnel, a heating zone intermediate the ends of said tunnel having a plurality of electrical rod resistors in the lower part of said tunnel and another plurality of electrical rod resistors in the upper part of said tunnel each rod resistor extending across the tunnel from side to side thereof, and said heating zone having refractory batt supporting members in the lower part of said tunnel just above the lower plurality of electrical rod resistors said batt supporting members extending lengthwise of the tunnel on either side thereof and parallel to each other, refractory flat batts extending from end to end of the tunnel not only in the heating zone thereof but also in the other parts of said tunnel and, in the heating zone, being supported by the refractory supporting members said batts therefore being above the lower plurality of electrical rod resistors in the heating zone and also being below the upper plurality of electrical rod resistors and there being a clear space between the lower rod resistors and the undersides of said batts, said tunnel being by the batts divided into an upper part and a lower part to reduce convection and provide for controlled heating and vitrification, the batts constituting supports for ware to be vitrified and there being a clear space in the heating zone from the top of the batts to the upper rod resistors whereby the ware is heated by direct radiation therefrom on the top and also by direct radiation to the underside of the batts and then through the batts which are relatively thin, each batt extending across the tunnel from a refractory supporting member on one side to a refractory supporting member on the other side, supporting members on the sides of the tunnel in the lower part thereof in all portions of the tunnel outside of the heating zone, all of the supporting members being so located and positioned that the tops of the batts form a continuous plane from end to end of the tunnel to the other end thereof, and a ram with associated actuating means at one end of the tunnel to move the batts through the tunnel.

6. In a tunnel kiln as claimed in claim 5, the combination with the parts and features therein specified, of a preheating zone between the heating zone and the entrance end of the tunnel where the ram is located, and means to supply air to the preheating zone in the upper part thereof to support combustion of organic material in the ware to be vitrified.

7. In a tunnel kiln as claimed in claim 6, the combination with the parts and features therein specified, of refractory round rods constituting part of the refractory supporting members in the heating zone, and the batts having grooves in the underside thereof and resting upon said round refractory rods with the rods located in the grooves.

8. In a tunnel kiln as claimed in claim 7, the combination with the parts and features therein specified, of the further feature that the batts are made of silicon carbide and the refractory round rods are made of alumina.

9. In a tunnel kiln as claimed in claim 5, the combination with the parts and features therein specified, of refractory round rods constituting part of the refractory supporting members in the heating zone, and the batts having grooves in the underside thereof and resting upon said round refractory rods with the rods located in the grooves.

10. In a tunnel kiln as claimed in claim 9, the combination with the parts and features therein specified, of the further feature that the batts are made of silicon carbide and the refractory round rods are made of alumina.

11. A tunnel kiln comprising a refractory structure forming a long straight tunnel, said tunnel being divided into a preheating zone, a heating zone and an annealing zone constituting parts of said tunnel in the order named from the entrance end to the exit end, said tunnel being further divided between top and bottom in all of said zones into an upper portion and a lower portion, a continuous succession of flat refractory batts extending in a plane through all of said zones and constituting the dividing means, a long line of supports for the batts on each side of the tunnel and well above the bottom thereof, the supports in the heating zone including a pair of lines of refractory cylindrical rods upon which the batts rest and slide, a bank of electrical resistors in the heating zone above the batts and extending across the upper portion, and a bank of electrical resistors in the heating zone below the batts and across the lower portion, and a ram having associated actuating means at the entrance end of the tunnel to push the batts through the tunnel.

12. In a tunnel kiln as claimed in claim 11, the combination with the parts and features therein specified, of means to supply air to the preheating zone.

13. A tunnel kiln comprising a refractory structure forming a relatively long tunnel, transversely spaced supports extending lengthwise within said tunnel and in a plane intermediate of the top and bottom of said tunnel, a succession of ware-carrying refractory batts in edge to edge engagement and each batt bridged across said spaced supports, said batts dividing the tunnel into an upper and a lower region, radiant heating means located in said lower region and underneath said batts to heat ware supported on said batts by heat penetration through the batt and into the ware, and means for protecting said heating means against possible batt breakage comprising disconnectably interfitting complementary elements located respectively at the adjacent trailing and leading edge faces of adjacent batts in said succession of batts whereby, should a batt fracture lengthwise in the direction of travel along said spaced supports, it receives support from an adjacent batt through their interfitting complementary elements.

14. A tunnel kiln, comprising a refractory structure forming a relatively long tunnel, transversely spaced supports extending lengthwise within said tunnel and in a plane intermediate of the top and bottom of said tunnel, a succession of ware-carrying refractory batts in edge to edge engagement and each batt bridged across said spaced supports, said batts dividing the tunnel into an upper and a lower region, radiant means for supplying heat to said upper region to heat ware supported on said batts from above and thereby effect heat penetration of the ware in downward direction, radiant heating means located in said lower region and underneath said batts to heat ware supported on said batts by heat penetration through the batt and into the ware, and means for protecting said last mentioned heating means against possible batt breakage comprising disconnectably interfitting complementary elements located respectively at the adjacent trailing and leading edge faces of adjacent batts in said succession of batts whereby, should a batt fracture lengthwise in the direction of travel along said spaced supports, it receives support from an adjacent batt through their interfitting complementary elements.

15. A tunnel kiln for the vitrification of grinding wheels and like ware comprising a refractory structure forming a relatively long tunnel and having therein transversely spaced supports extending longthwise in a plane intermediate of the top and bottom of said tunnel; a succession of ware-carrying batts of refractory material in said tunnel with each batt bridged across said supports; said batts having, at those portions of their adjacent end edges that intervene said spaced supports, interfitting projecting elements and recessed elements which are receivable one into the other upon movement of one batt into edge to edge relation to the other and disengageable from each other upon movement of one batt away from the other; radiant means for supplying heat to said tunnel and including radiant heating means to supply heat to the space beneath said batts for heating the ware by heat penetration through the batts; movable batt-engaging means at one end of the tunnel having means mounting it for movement in the direction of the length of the tunnel and inwardly of the latter, whereby, upon actuation, a batt engaged thereby is moved along said supports toward the endmost batt of said succession of batts to effect interfitting engagement between the projecting elements and recessed elements of said engaged batt and of said endmost batt; and means for actuating said movable batt-engaging means in said direction throughout a range of movement greater than that needed to move a batt along said supports and into interfitting engagement with said endmost batt of said succession of batts and thereby through the added batt push all of the batts along said supports and thereby hold the projecting elements and recessed elements at the adjacent edges of all of the batts against disengagement from each other.

16. A tunnel kiln comprising a refractory structure forming a relatively long tunnel, transversely spaced supports extending lengthwise within said tunnel and in a plane intermediate of the top and bottom of said tunnel, a succession of refractory batts in edge to edge engagement and each batt bridged across said spaced supports, said batts dividing the tunnel into an upper and lower region, radiant means for supplying heat to said upper region to heat ware supported on said batts from above and thereby effect heat penetration of the ware in downward direction, radiant heating means for supplying heat to said lower region to heat said ware from below by heat penetration through the batts and into the ware, said batts being relatively thin and having flat upper surfaces for receiving the ware and having transversely spaced longitudinally extending thickened reinforcing portions respectively overlying said spaced supports, said thickened portions and said spaced supports having coacting wear-resisting guiding means for aiding in substantially aligning said batts for movement along said spaced supports, and means for protecting against the hazards of fracture of a batt lengthwise in the direction of its movement along said spaced supports, said last-mentioned means comprising disconnectable interfitting complementary elements located respectively at the adjacent trailing and leading edge faces of adjacent batts in said succession of batts whereby, upon such fracture of a batt, its parts receive support from an adjacent batt through their interfitting complementary elements.

17. A tunnel kiln comprising a refractory structure forming a relatively long tunnel, transversely spaced supports extending lengthwise within said tunnel, a succession of ware-carrying batts in edge to edge engagement and each batt bridged across said spaced supports, said tunnel having a heating zone therein intermediate its ends with radiant heating means in said zone below said supports for heat-treatment of ware carried by said batts, said batts being movable along said spaced supports and, as they are advanced therealong, moving into and out of said heating zone, means for protecting against the hazards of fracture by heat shock of a batt lengthwise of its direction of movement comprising disconnectable interfitting complementary elements located respectively along the leading and trailing edge faces of adjacent batts in said succession of batts so that, upon such fracture of a batt, its parts receive support from an adjacent batt through their interfitting complementary elements, and means for maintaining said complementary elements of adjacent batts interfitted throughout the transition of the batts through said heating zone, said last-mentioned means comprising means for advancing said succession of batts along the spaced supports in said tunnel each at the same rate of movement whereby separating movement between adjacent batts as would disconnect the interfitting complementary elements at their adjacent and leading and trailing edge faces is prevented.

18. A tunnel kiln for the vitrification of grinding wheels and like ware comprising a refractory structure forming a relatively long tunnel and having a heating zone therein intermediate its ends, radiant heating means for supplying heat to said zone, a continuous support extending from end to end of the tunnel and comprising transversely spaced portions, said radiant heating means being disposed above and below the plane of said transversely spaced portions, said spaced portions in said heating zone each comprising a line of brick-like refractory members arranged in continuous end to end relation and each refractory member having in its upper face a substantially straight and continuous way, there being in the said continuous way of each of said spaced portions in the heating zone a continuous line of refractory rods arranged in end to end relation and each resting removably therein and supported substantially throughout its length, relatively thin flat batts of refractory material of good heat conductivity for carrying the ware flatwise, the batts being bridged across said spaced portions and in the heating zone being supported by and slidable along the two lines of rods in said ways, movable means at one end of the tunnel to engage an endmost ware-carrying batt, and mechanism for actuating said movable means in successive strokes of movement to introduce ware-carrying batts one by one into the tunnel and slide the engaged batt and those in advance of it along said support toward the opposite end of the tunnel.

19. A tunnel kiln as claimed in claim 18 in which said guideways are V-shaped and said refractory rods are round in cross section and of a diameter to engage each of the inclined walls of the V-shaped guideways.

GEORGE N. JEPPSON.
EDWARD VAN DER PYL.
WALLACE L. HOWE.

REFERENCES CITED

The following references are of record in the file of this patent:

UNITED STATES PATENTS

| Number | Name | Date |
| --- | --- | --- |
| 409,489 | Nungesser | Aug. 20, 1889 |
| 671,990 | Diescher et al. | Apr. 16, 1901 |
| 1,306,160 | Zwermann | June 10, 1919 |
| 1,556,260 | Steere | Oct. 6, 1925 |
| 1,557,040 | Francart | Oct. 13, 1925 |
| 1,559,199 | Straight | Oct. 27, 1925 |
| 1,590,154 | Duckham | June 22, 1926 |
| 1,649,926 | Ruckstahl et al. | Nov. 22, 1927 |
| 1,686,083 | Geiger | Oct. 2, 1928 |
| 1,776,823 | Summey | Sept. 30, 1930 |
| 1,799,980 | Hartford | Apr. 7, 1931 |
| 1,802,235 | Campbell | Apr. 21, 1931 |
| 1,809,628 | Johnson | June 9, 1931 |
| 1,827,543 | Robertson | Oct. 13, 1931 |
| 1,875,365 | Begeman | Sept. 6, 1932 |
| 1,882,052 | Wyatt | Oct. 11, 1932 |
| 1,983,082 | Howe et al. | Dec. 4, 1934 |
| 1,996,851 | Benner et al. | Apr. 9, 1935 |
| 2,034,721 | Howe | Mar. 24, 1936 |
| 2,073,590 | Sanford | Mar. 9, 1937 |
| 2,268,663 | Kuzmick | Jan. 9, 1942 |
| 2,290,551 | Gier | July 21, 1942 |
| 2,309,463 | Lombard et al. | Jan. 26, 1943 |
| 2,320,172 | Brooke et al. | May 25, 1943 |
| 2,334,048 | Van der Pyl | Nov. 9, 1943 |
| 2,351,433 | Jeppson et al. | June 13, 1944 |
| 2,359,157 | Roth | Sept. 26, 1944 |
| 2,363,291 | Brittain | Nov. 21, 1944 |
| 2,398,890 | Howard | Apr. 23, 1946 |
| 2,404,059 | Hall | July 16, 1946 |
| 2,404,598 | Sachse | July 23, 1946 |
| 2,423,293 | Ciell | July 1, 1947 |
| 2,465,137 | Van Nordstrand | Mar. 22, 1949 |

FOREIGN PATENTS

| Number | Country | Date |
| --- | --- | --- |
| 90,779 | Sweden | Nov. 9, 1937 |

Certificate of Correction

August 15, 1950

Patent No. 2,519,250

GEORGE N. JEPPSON ET AL.

It is hereby certified that error appears in the printed specification of the above numbered patent requiring correction as follows:

Column 19, lines 73 and 74, for the words "end to end" read *one end*; column 23, line 12, before "substantially" insert *therein*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*